US006819415B2

(12) United States Patent
Gerstner et al.

(10) Patent No.: US 6,819,415 B2
(45) Date of Patent: Nov. 16, 2004

(54) ASSEMBLY FOR INCREASING THE DEPTH DISCRIMINATION OF AN OPTICAL IMAGING SYSTEM

(75) Inventors: Volker Gerstner, Jena (DE); Frank Hecht, Weimar (DE); Ralph Lange, Jena (DE); Helmut Bloos, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/089,878

(22) PCT Filed: Aug. 4, 2001

(86) PCT No.: PCT/EP01/09049

§ 371 (c)(1),
(2), (4) Date: Aug. 12, 2002

(87) PCT Pub. No.: WO02/12945

PCT Pub. Date: Feb. 14, 2002

(65) Prior Publication Data

US 2003/0086067 A1 May 8, 2003

(30) Foreign Application Priority Data

Aug. 8, 2000 (DE) .......................................... 100 38 527

(51) Int. Cl.[7] .......................... G01B 9/00; G01B 11/24; G01C 3/08; H01J 3/14; G06K 9/36
(52) U.S. Cl. ...................... 356/124; 356/4.09; 356/603; 356/604; 250/237 G; 382/285; 382/286
(58) Field of Search ............................... 356/4.09, 124, 356/603, 604, 606, 607, 616, 634; 250/237 G; 382/285, 286, 106, 108

(56) References Cited

U.S. PATENT DOCUMENTS

| 4,641,972 A | * | 2/1987 | Halioua et al. |
| 4,984,893 A | | 1/1991 | Lange |
| 5,471,308 A | * | 11/1995 | Zeien |
| 5,493,400 A | | 2/1996 | Gröbler et al. |

(List continued on next page.)

FOREIGN PATENT DOCUMENTS

| DE | 34 13 605 | 10/1985 |
| DE | 41 29 796 | 4/1993 |

(List continued on next page.)

OTHER PUBLICATIONS

English Abstract of DE 44 36 500 A1.
English Abstract of DE 199 30 816 A1.

(List continued on next page.)

*Primary Examiner*—Frank G. Font
*Assistant Examiner*—Khaled Brown
(74) *Attorney, Agent, or Firm*—Reed Smith LLP

(57) ABSTRACT

A method and arrangement are disclosed for increasing the depth contrast in microscope imaging. The method and implementation described can be designated as structured illumination for generating quasi-confocal optical sections. In implementing the method, a grating structure located in the field diaphragm plane of a microscope, the object plane and the TV intermediate image plane of a microscope are arranged confocally. The term "confocally" refers to the fact that the grating, object and the intermediate image plane are positioned on optically conjugate planes. By this arrangement, the grating structure is projected in the object plane of the microscope and the object which is structured in this way is imaged in the TV intermediate image plane of the microscope by the optical system following it. Optical sections are generated by calculating the modulation depth of the structured object. Three-dimensional acquisition of the object is achieved in that the object is imaged in a plurality of focus planes at right angles to the direction of observation and is detected using an array detector (e.g., CCD camera). The method and implementation of structured illumination described herein can primarily be used in reflection microscopy and fluorescence microscopy. In principle, the method can be applied for all linear interactions between light and matter. The use of the method is likewise not limited to the field of microscopy.

51 Claims, 9 Drawing Sheets

U.S. PATENT DOCUMENTS

| | | | |
|---|---|---|---|
| 5,581,352 A | * | 12/1996 | Zeien |
| 5,867,604 A | * | 2/1999 | Ben-Levy et al. |
| 5,878,152 A | * | 3/1999 | Sussman |
| 5,912,768 A | * | 6/1999 | Sissom et al. |
| 6,025,905 A | * | 2/2000 | Sussman |
| 6,084,712 A | * | 7/2000 | Harding |
| 6,144,453 A | * | 11/2000 | Hallerman et al. |
| 6,219,461 B1 | * | 4/2001 | Wallack |
| 6,262,803 B1 | * | 7/2001 | Hallerman et al. |
| 6,269,197 B1 | * | 7/2001 | Wallack |
| 6,438,272 B1 | * | 8/2002 | Huang et al. |

FOREIGN PATENT DOCUMENTS

| | | |
|---|---|---|
| DE | 44 36 500 A1 | 5/1995 |
| DE | 199 30 816 A1 | 1/2001 |
| JP | 7-159324 | 6/1995 |
| WO | WO 97/06509 | 2/1997 |
| WO | WO 98/45745 | * 10/1998 |

OTHER PUBLICATIONS

Article: Real–Time Three–Dimensional Imaging of Macroscopic Structures, T. Wilson, M. A. A. Neil & R. Juskaitis, Department of Engineering Science, University of Oxford, Parks Road, Oxford OX1 3 PJ, U.K. Journal of Microscopy, vol. 191, Pt. 2., pp. 116–118, Aug. 1998.

Article: Optics Communications Real Time 3D Fluorescence Microscopy by Two Beam Interference Illumination, T. Wilson, M. A. A. Neil & R. Juskaitis, Department of Engineering Science, University of Oxford, Parks Road, Oxford OX1 3 PJ, U.K. Jul. 15, 1998.

Article: Grating Image Systems for Optical Sectioning Fluorescence Microscopy of Cells, Tissues, and Small Organisms, Frederick Lanni and Tony Wilson, Imaging Neurons—a Laboratory Manual, Cold Spring Harbor Laboratory Press 2000.

Article: Optical Sectioning Fluorescence Spectroscopy in a Programmable Array Microscope, Quentin S. Hanley, Peter J. Verveer, and Thomas M. Jovin, Applied Spectroscopy vol. 52, No. 6, 1998.

Article: Method of Obtaining Optical Sectioning by Using Structured Light in a Conventional Microscope, T. Wilson, M. A. A. Neil & R. Juskaitis, Department of Engineering Science, University of Oxford, Parks Road, Oxford OX1 3 PJ, U.K. vol. 22, No. 24/Optics Letters, December 15, 1997.

* cited by examiner

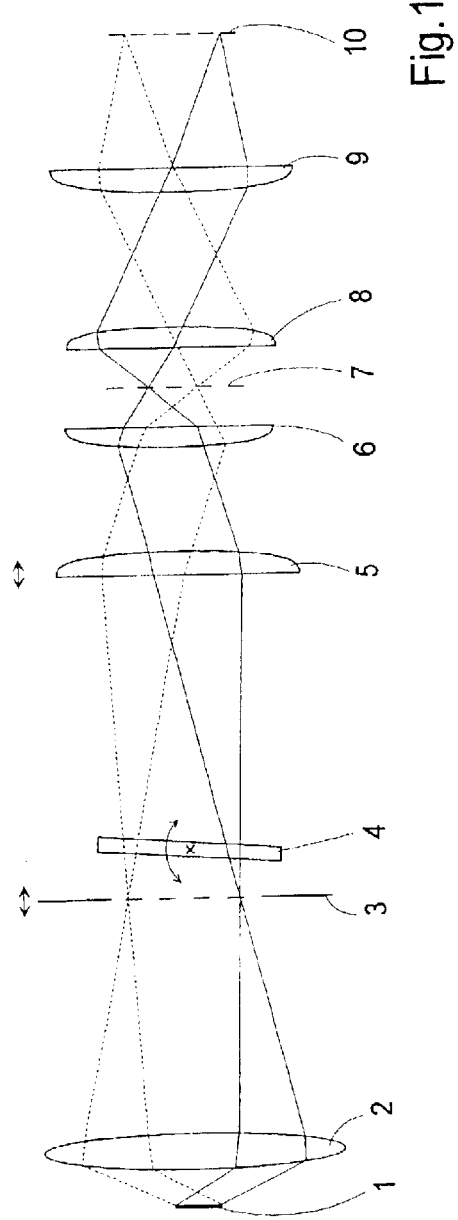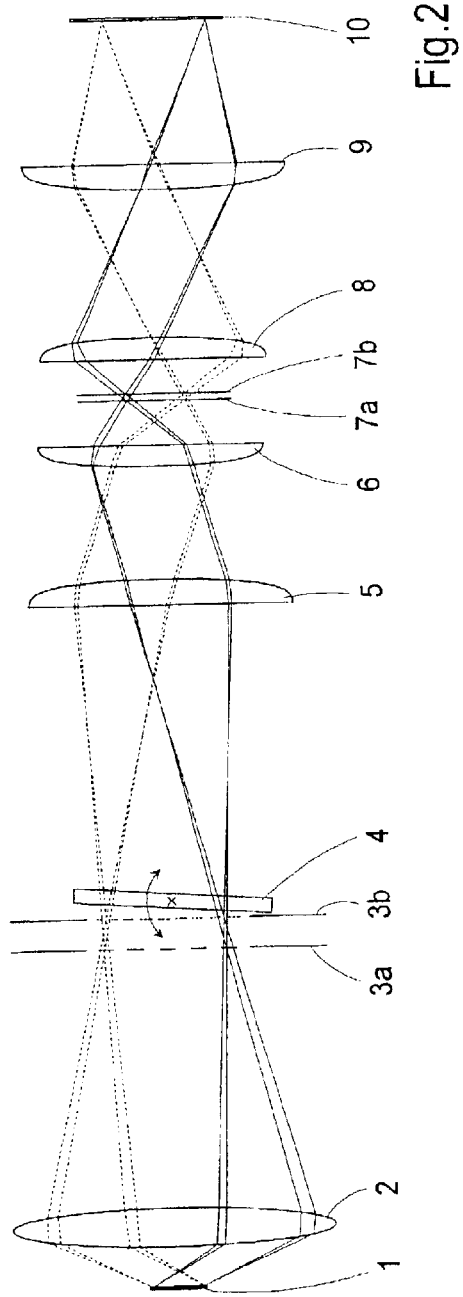

ASSEMBLY FOR INCREASING THE DEPTH DISCRIMINATION OF AN OPTICAL IMAGING SYSTEM

CROSS-REFERENCE TO RELATED APPLICATIONS

This application claims priority of International Application No. PCT/EP01/09049, filed Aug. 4, 2001 and German Application No. 100 38 527.3, filed Aug. 8, 2000, the complete disclosures of which are hereby incorporated by reference.

BACKGROUND OF THE INVENTION a) Field of the Invention

The invention relates to an assembly for increasing the depth discrimination of an optical imaging system.

b) Related Art

[1] Gröbler, et al.
  U.S. Pat. No. 5,493,400, "Arrangement for projecting a test pattern onto a surface to be investigated: Priority date: Jul. 7, 1993
[2] G. Schöppe et al.
  German Application "Optical projection grating" Priority date: Oct. 26, 1993
[3] G. Schöppe
  "Method and device for depth selection of microscope images" German File Number 199 30 816.0: Jul. 9, 1999
[4] Ben Levy, et al.
  U.S. Pat, No. 5,867,604 "Imaging measurement system", Continuation-in-Part of 08/510,632, Priority date: Aug. 3, 1995, US
[5] Ben Levy, et al.
  PCT Application WO 97/06509, "Imaging measurement system" Priority date: Aug. 3, 1995

Publications

[6] T. Wilson, et al.
  "Method of obtaining optical sectioning by using structured light in a conventional microscope", *Optics Letters* 22 (24) (1997)
[7] T. Wilson, et al.
  "Real-time three-dimensional imaging of macroscopic structures", *Journal of Microscopy* 191 (2) (1998)
[8] M. A. A. Neil, et al.
  "Real time 3D fluorescence microscopy by two beam interference illumination", *Optics Communications* 153, (1998)
[9] F. Lanni, et al.
  "Grating Image Systems for Optical Sectioning Fluorescence Microscopy of Cells, Tissues and Small Organisms", published in *Imaging Neurons—A Laboratory Manual*, edited by R. Yuste, F.
  Lanni, A, Konnerth, Cold Spring Harbor Laboratory Press (2000)
[10] Q. S. Hanley, P. J. Verveer, T. M. Jovin
  "Optical sectioning fluorescence spectroscopy in a programmable array microscope", *Applied Spectroscopy* 52 (6): 783 (1998)

SUMMARY OF THE INVENTION

The current invention involves the method for increasing the depth discrimination of optically imaging systems. The method comprises the steps of: projecting a periodic structure in the object; detecting multiple structured images of the object with different phase angles of the projected structure; and generating optical sections by evaluation of the images with the N different phase angles by utilizing different equations.

BRIEF DESCRIPTION OF THE DRAWINGS

FIG. 1 shows a simplified optical schematic of structured illumination. The image-forming beam path is shown. A one-dimensional transmission grating (3) located in a focus plane of the optical arrangement shown in the drawing is illuminated by a light source (1) and collector optics (2) succeeding the latter. The transmission grating can be moved in axial direction (parallel to the optical axis of the system). Possible movements are indicated by the arrow shown in the drawing. The grating is succeeded in the direction of light by a plane-parallel glass plate (4). The angle of the plane-parallel plate with respect to the optical axis can be adjusted in a defined manner. The structure is imaged in the specimen plane (7) by the succeeding illumination-side lenses1 (5 and 6) (tube lens and objective or condenser). The possible movements of the lens (5) (tube lens) indicated by an arrow can be used as an alternative solution to the movement of the grating (3), since an axial displacement of the tube lens substantially equals an axial displacement of the focus plane.

Figure 3:
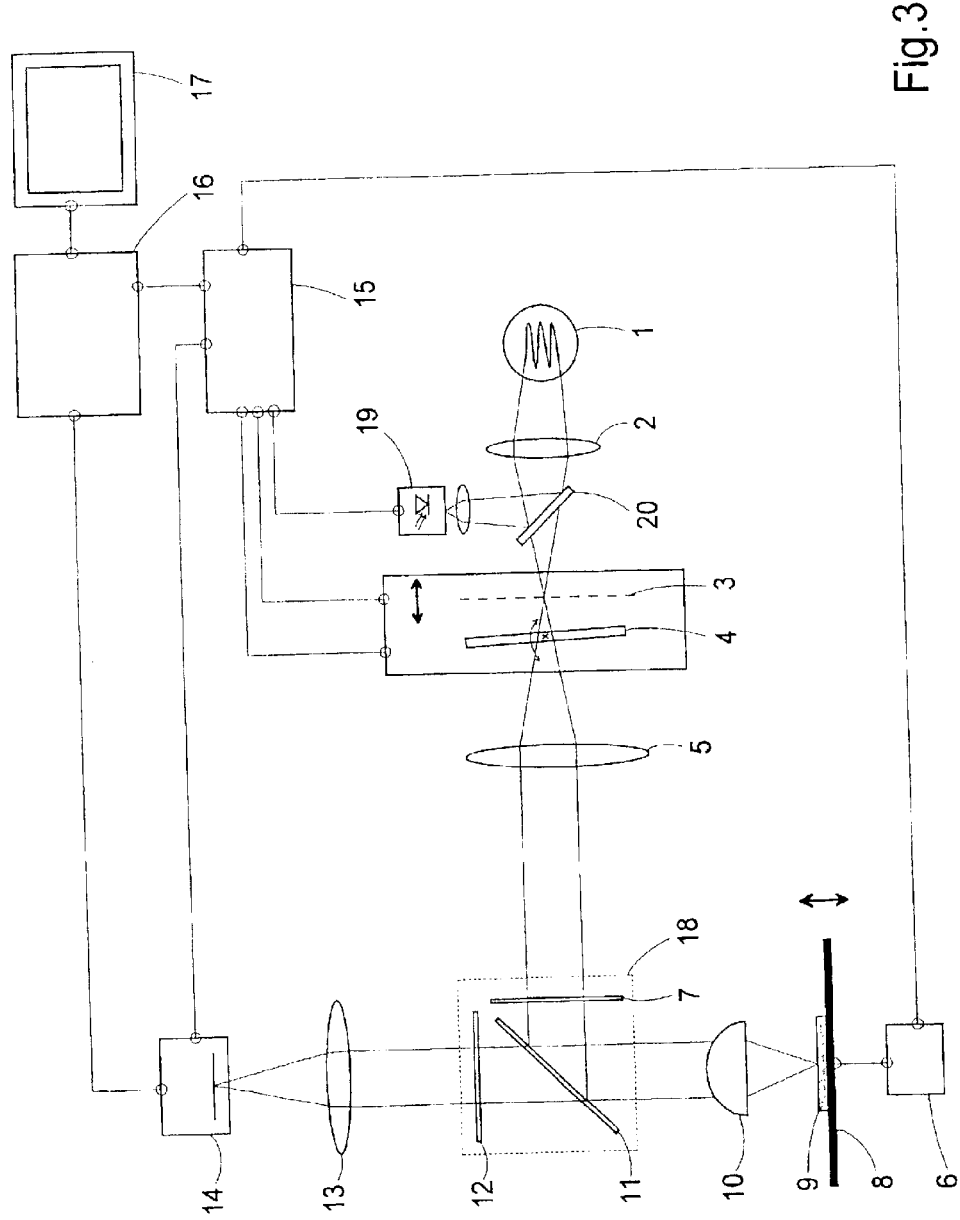

By "lenses" is meant, in general, also complex lens systems.

Light proceeding from the specimen is imaged again through a pair of lenses (8 and 9) (objective and tube lens) in the focus plane (10) following the latter.

FIG. 2 schematically shows the longitudinal chromatic aberrations which occur, in general, in the optical arrangement from FIG. 1. The image-forming beam paths for two different wavelengths are shown. Due to the longitudinal chromatic aberration of the lens combinations, the focus planes for different wavelengths extend axially at different locations. This longitudinal chromatic aberration can be corrected by an axial displacement of the grating (or of the tube lens (5)). This is indicated by the grating positions (3a) and (3b). Further, the same axial location in the specimen is not sharply imaged for both wavelengths. This is shown by the focus planes (7a) and (7b). The difference in the position of the focus planes (7a) and (7b) leads, e.g., with multifluorescence, to an erroneous acquisition of the object. The chromatic shift of the focus planes in the object can be taken into account by a software correction of the axial positions.

FIG. 3 shows a construction of the optical arrangement from FIG. 1 or FIG. 2 for incident fluorescence detection in microscopy. A structure 3 (sine grating or binary transmission grating) is illuminated by a lamp (1) and succeeding lens (2). The position of the structure can be varied axially, e.g., by a motor-driven eccentric movement (see FIG. 7). For control purposes, the motor of the eccentric is connected to the control electronics by a cable. A plane-parallel transparent glass plate (4) (e.g., made from BK7 or fused silica) succeeding the latter can be offset in different angular positions relative to the optical axis, e.g., by means of a scanner (FIG. 7). For control purposes, the scanner is connected to the electronics box by a cable. The spatial phase of the structure can be varied (FIG. 5) by the parallel offset of the plate. The succeeding (illumination-side) tube lens (5) images the structure in the infinity space of the ICS optics of the microscope. The structure is imaged in the specimen plane through the excitation filter (7), the dichroic beam splitter (11) and the objective (10). The preparation or specimen (9) is located on the vertically adjustable object stage (8). The height of the stage (8) can be adjusted in the direction indicated by the arrow by the drive mechanism (6). For this purpose, the drive mechanism is connected to the electronics control unit (15) by a cable. The fluorescent light emitted by the specimen is separated from the excitation light by the dichroic color splitter and the emission filter (12) succeeding the latter. The excitation filter, dichroic beam splitter and emission filter are grouped together (18). Finally, the structured fluorescence emission is focused on the intermediate image plane of the camera by a tube lens (13). The CCD chip of the camera (14) detects the fluorescence emission which is structured in this way. The camera data are transferred to the PC (16). The axial position of the structure (grating) and the angle of the plane-parallel plate relative to the optical axis can be adjusted by the PC via the electronic interface with the control electronics. For this purpose, the control electronics are connected to a scanner, e.g., a galvanometer scanner (e.g., M2T, manufactured by General Scanning, 500 Arsenal Street, Watertown, Mass. 02472). Finally, the spatial phase of the grating can accordingly be adjusted (FIG. 6). Further, the axial position of the grating is adjustable. In this way, longitudinal chromatic aberrations can be minimized (FIG. 2). This enables the spatial-phase-dependent acquisition and calculation of the structured images for calculating an optical section image under different chromatic conditions. The result of the calculation is displayed on the monitor 17. In order to measure the illumination intensity, a small proportion of the excitation light is coupled out, e.g., via a plane-parallel plate (20), and focused on a photodiode through a lens. The voltage of the photodiode is supplied to the control electronics via a cable connection. After analog-digital conversion, the digital value is used for correcting instabilities of the light source.

Possible implementations of the axial displacement of the grating and adjustment of the angle of the plane-parallel plate are shown in FIG. 7.

Figure 4:
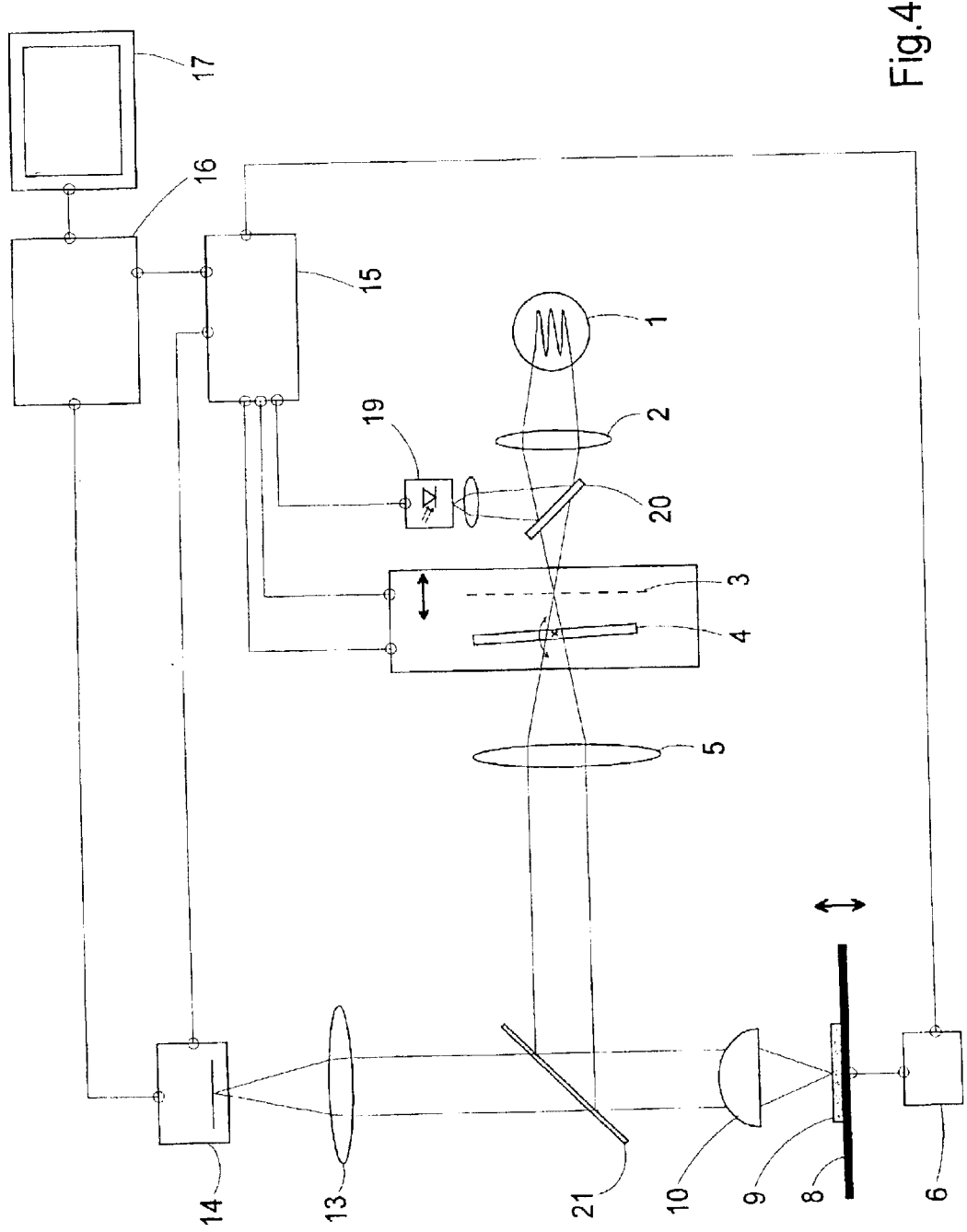

FIG. 4 shows a corresponding arrangement for a reflecting specimen. For this purpose, the component group (18) shown in FIG. 3 is replaced by a 50:50 beam splitter (21) (e.g., a semitransparent mirror).

Figure 5:
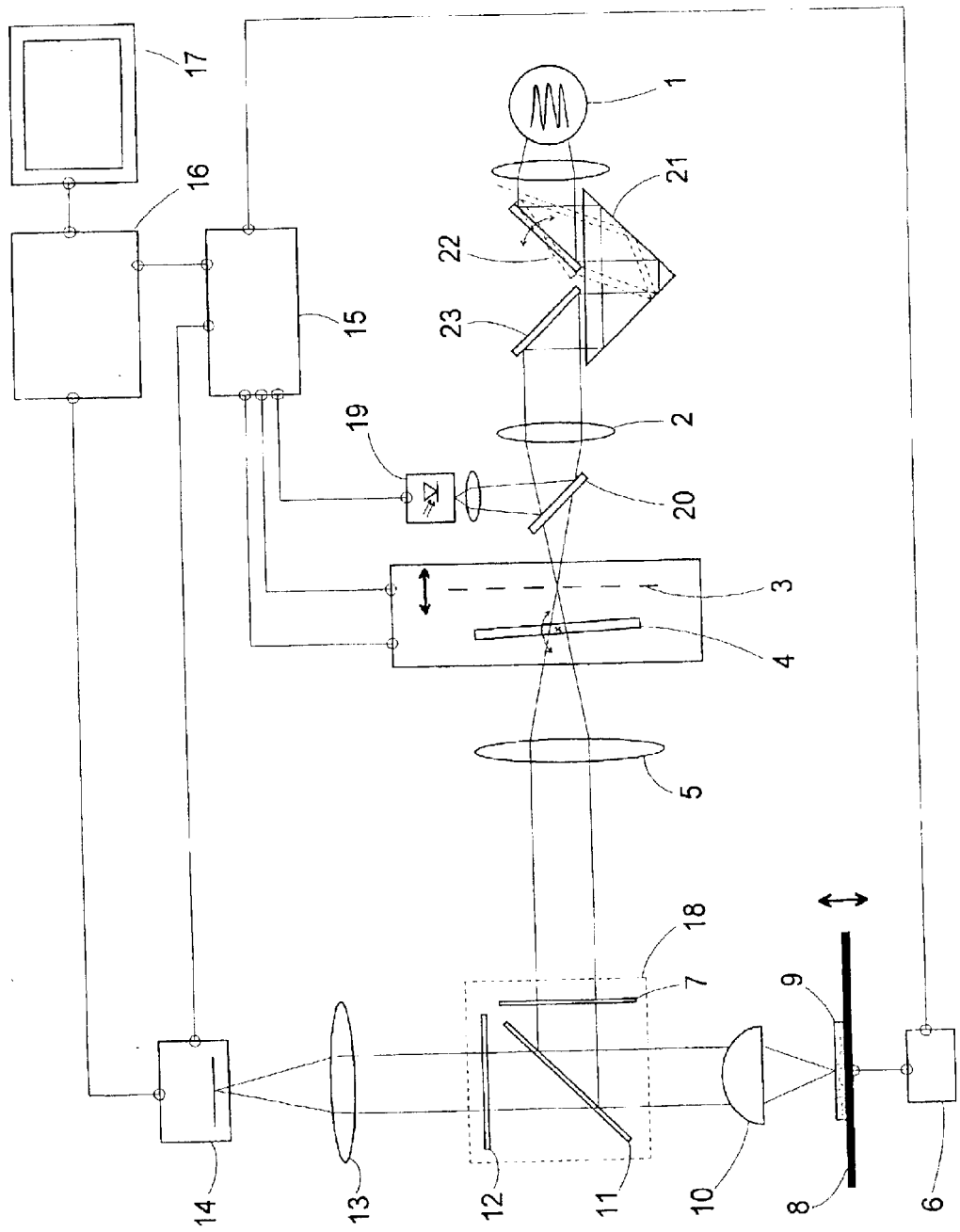
Figure 6:
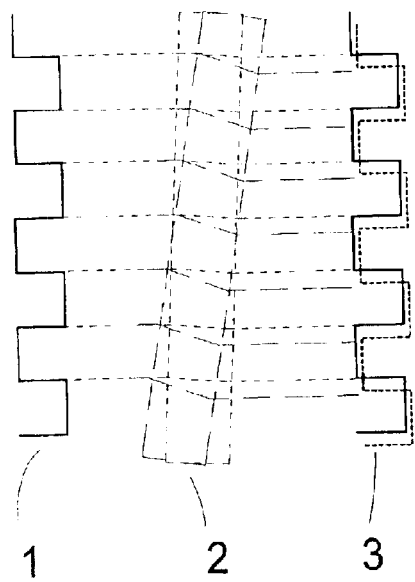

FIG. 5 shows an expanded system with an electronic shutter for controlling the exposure cycles for camera detection. The shutter shown here comprises a plane mirror (22) whose angle relative to the optical axis can be adjusted, e.g., by a galvanometer scanner, followed by a prism (21), and a stationary mirror (23). Through the combination of the plane mirror whose angle relative to the optical axis is adjustable, the prism and the fixed plane mirror, an "open" position (beam path indicated by solid lines) and a "closed" position of the optical arrangement (beam path in dashed lines) can be realized.

The arrangement makes it possible to switch the light source on and off rapidly. Realistic switching times are in the range of about 1 ms to 10 ms. The minimum shutter times are limited by the response times of the scanner with typical mirror diameters of about 20 mm.

The essential advantage in this case consists in the fast switching time of the arrangement and the negligible wear of the described arrangement compared to normal wear.

FIG. 6 is a schematic diagram showing the adjustment of the spatial phase of the grating. The square grating 1 shown in the drawing is imaged via a plane-parallel glass plate 2. The image of the grating 3 can be displaced depending on the angle of the plate. This makes it possible to adjust the phase of the grating without mechanical movement thereof.

Figure 7A:
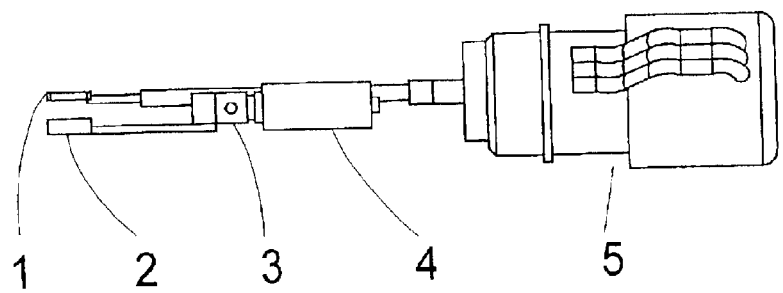

FIG. 7a shows a side view of the mimic for adjusting the axial position of the grating and the adjustment of the angle of the plane-parallel plate. The axial position (height) of the structure (2) can be adjusted by means of a motor (4)-controlled eccentric (3). A galvanometer scanner (5) makes it possible to adjust the angle of the plane-parallel plate (1) by a rotating movement. The same arrangement is shown in a top view in FIG. 7b.

Figure 8:
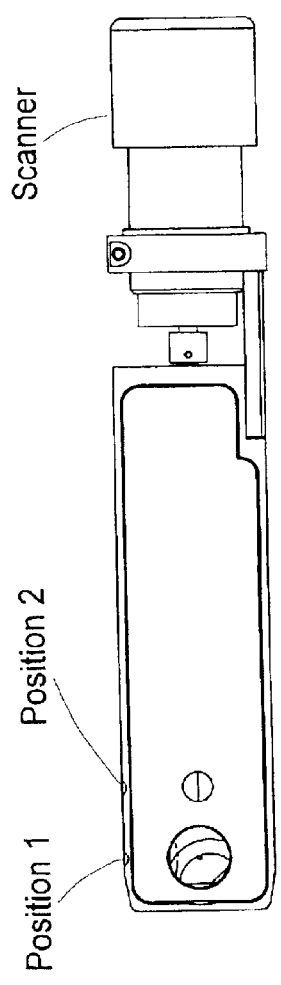

Finally, FIG. 8 shows a construction of the overall module in which two diaphragm apertures are provided. The aperture designated as position 1 is a structure-free optical passage with a variable iris diaphragm (field diaphragm of the microscope). Position 2 contains the optical arrangement, which was described in detail above, comprising structure and plane-parallel plate in the optical beam path. The arrangement shown in this Figure makes it possible to change, for example, from conventional incident light microscopy to structured illumination in a simple manner. For this purpose, the entire module shown here must be moved perpendicular to the optical axis into the desired position.

Figure 9:
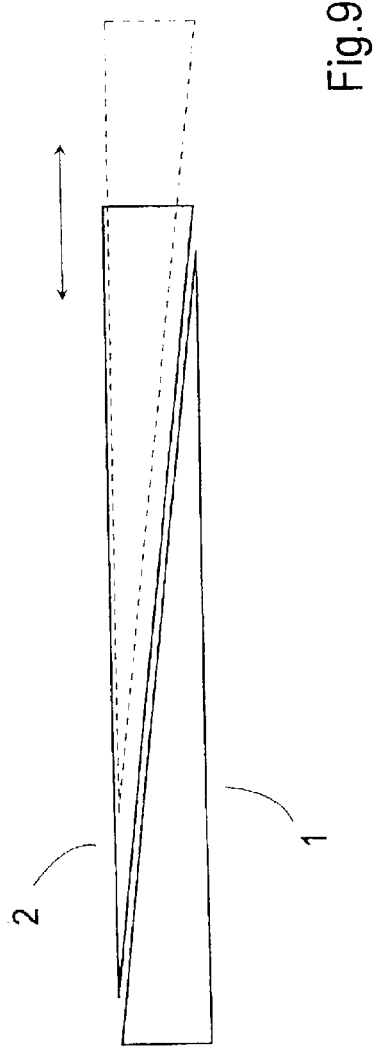

FIG. 9 shows a possibility for correcting the longitudinal chromatic aberration in the LFB plane. For this purpose, two optical glass wedges (1) (2) are used. One of the two wedges can be displaced, e.g., by a linear motor, in the direction indicated by the arrow. The arrangement shown in the drawing allows the optical path length to be varied.

Figure 10:
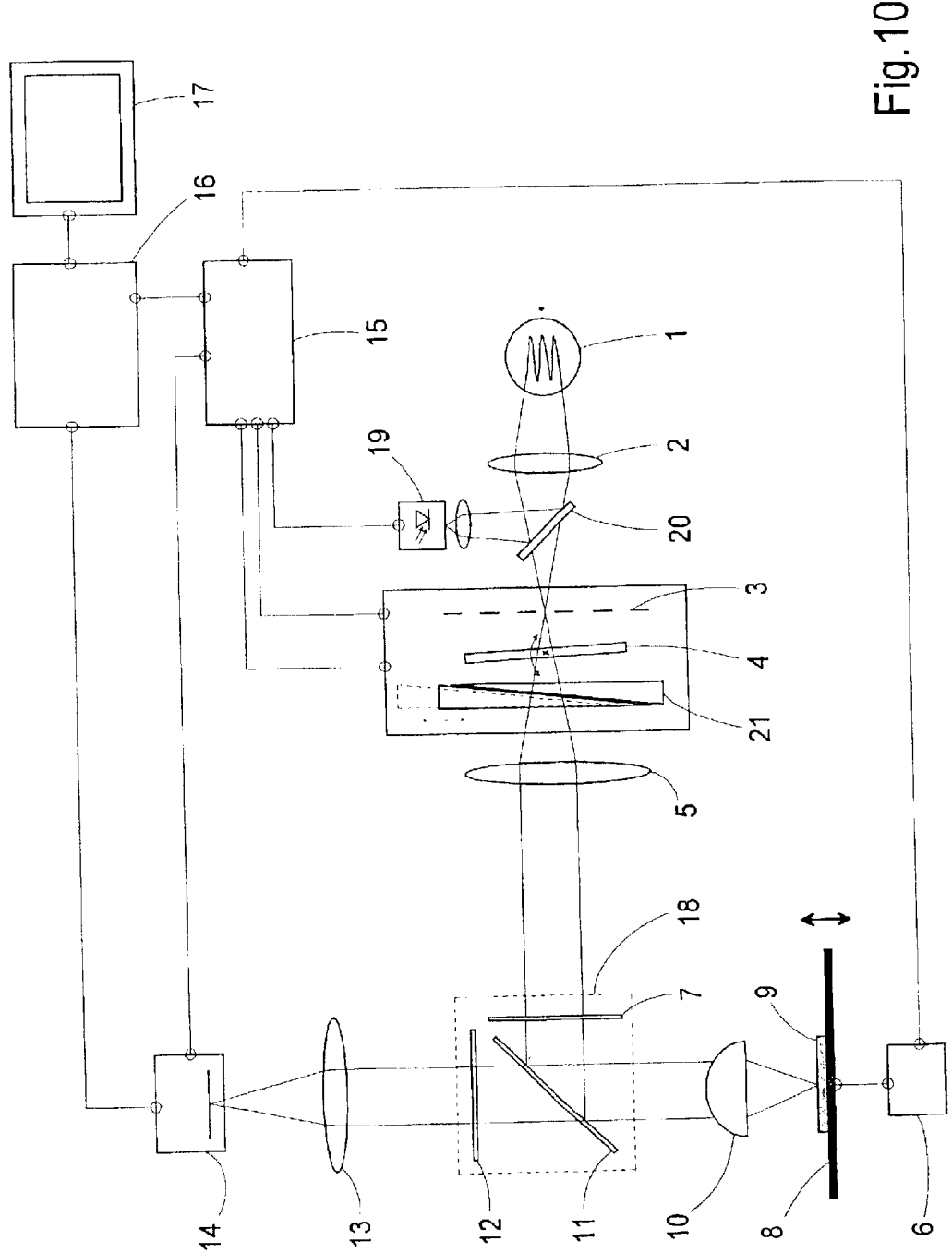

In FIG. 10, the changing of the optical path length for correcting the longitudinal chromatic error by means of optical wedges (FIG. 9) is integrated in a construction of the optical system. This Figure corresponds to FIG. 3 with the exception of the wedge arrangement (21).

Figure 11:
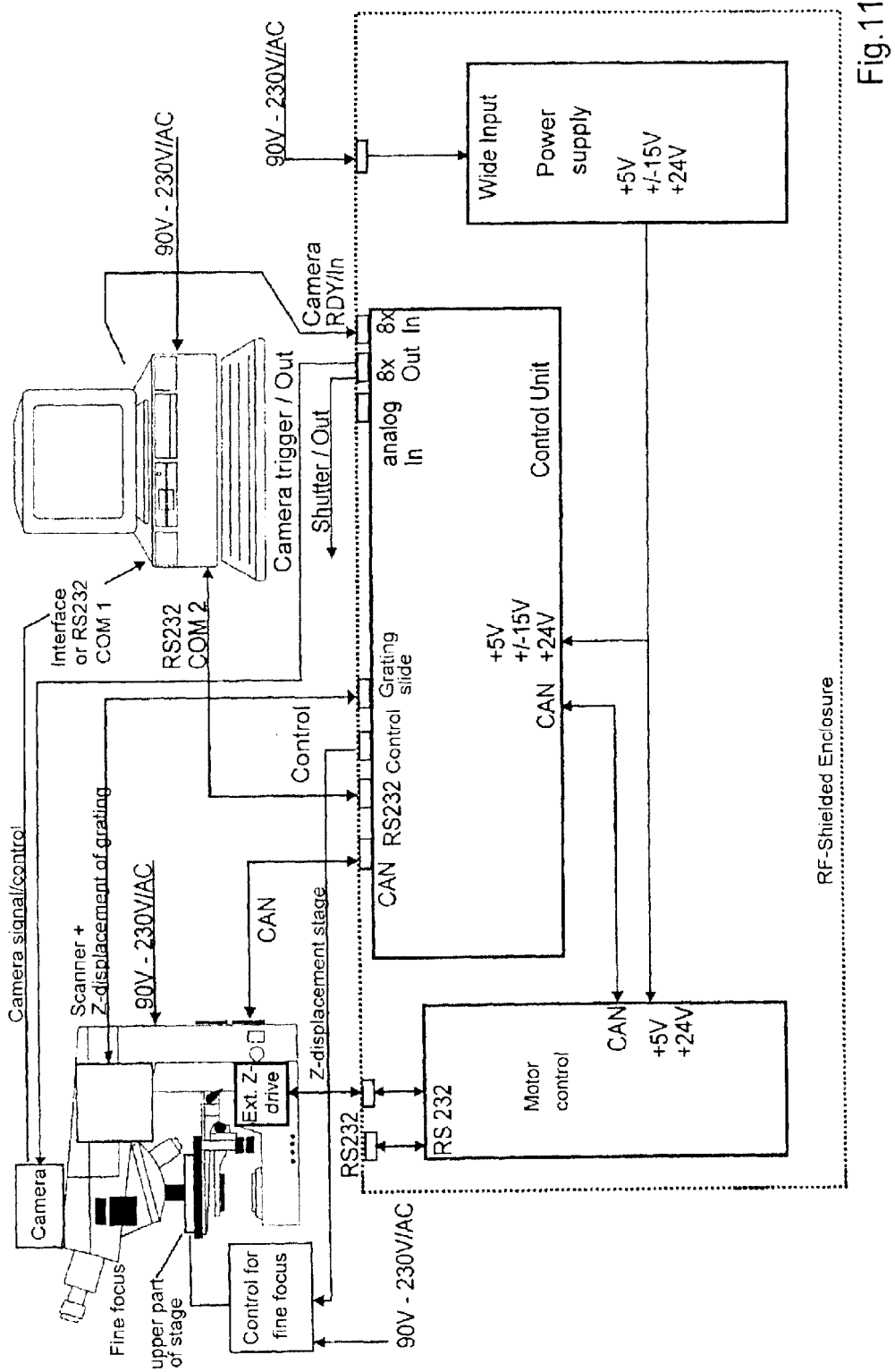

FIG. 11 is a schematic view of the microscope system and the electronic components.

Figure 12:
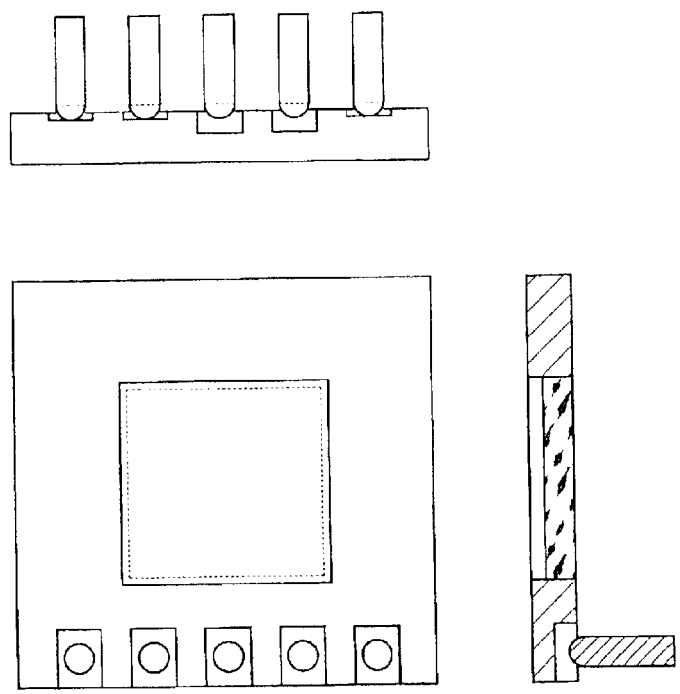

FIG. 12 shows the carrier of the grating from FIG. 7 (2) in an embodiment with coding. The five electronic contacts shown in the drawing are used by the conducting pins, also shown, to realize the desired binary information for automatic detection of the implemented grating carriers. Coded gratings are useful, particularly when gratings are exchanged mechanically, so as to prevent user errors due, for example, to incorrectly adjusted spatial phases for calculating section images by the automatic detection.

Figure 13:
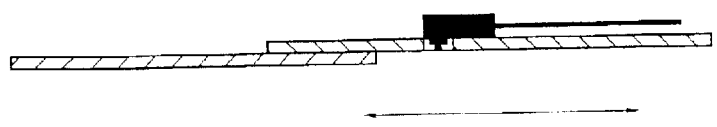

The automatic detection of a mechanical module is implemented in FIG. 13. A photosensitive receiver can be covered or opened by the relative movement, indicated by the arrow, between the two interfaces or boundary surfaces. Automatic position detection can be realized in this way.

DESCRIPTION OF THE METHOD AND PREFERRED EMBODIMENTS

The principle of structured illumination will be described in the following. A structure is located in the plane of the field diaphragm (LFB) of a microscope. In the following, the structure is a one-dimensional or two-dimensional periodic structure. For example, the one-dimensional or two-dimensional period structure (grating) can be a transmission grating or reflection grating fabricated by lithography. The arrangement of the grating can be binary (square grating) or sinusoidal (sine grating). The grating is imaged in the object plane by suitable optical elements (illumination-side tube lens and, e.g., objective). A reflecting or fluorescing object, for example, is located in the object plane. The lateral structure of the illumination intensity, with linear interaction, results in a structured object. The structured object is imaged, in turn, via the objective and the TV-side tube lens, in the succeeding intermediate image plane and is registered by an array detector (see Figure). The sensor surface of the detector is situated in the intermediate image plane (TV output at the microscope).

The increase in depth contrast in a microscope recording with structured illumination is ultimately attributable to the fact that only the mean value (or DC component) in conventional microscope imaging does not disappear when defocusing. However, when an object with a structure whose spatial frequency (or frequencies) is (or are) not equal to zero is illuminated and only the proportion of image information that was imaged in a structured manner is subsequently evaluated, the DC component (zero frequency) can be numerically removed. This increases the depth contrast. The structure of the illumination "marks" the portion of the object located in the focus of the optical system.

Essentially the modulation depth (AC component) of the structured object must be determined by pixel in order to calculate the optical section. In the simplest case of a one-dimensional periodic sinusoidal structure, with a linear interaction, the image-side intensity $I=I(x,y,\phi)$ with spatial variables x,y and the parameter for the spatial phase angle of the periodic structure $\phi$ is given by $$I(x,y,\phi) = a_{0x,y} + m_{x,y} \cdot \sin(k_x x + \phi) \quad \text{Equation 1}$$

where the locally dependent modulation depth $m_{x,y} =: m(x, y)$.

On the one hand, the modulation depth is dependent on the grating frequency, the imaging optics and the object being viewed.

Using addition theorems, this can be written as $$I_{x,y}(\phi) = a_{0x,y} + a_{1x,y} \cdot \sin(\phi) + b_{1x,y} \cdot \cos(\phi) \quad \text{Equation 2}$$

where $\phi$ is the phase angle of the sinusoidal structured illumination, $a_{0x,y}$ is the DC component (=mean value) and $$a_{1x,y} = m_{x,y} \cos(k_x x) \quad \text{Equation 3}$$

$$b_{1x,y} = m_{x,y} \sin(k_x x) \quad \text{Equation 4}$$

so that it immediately follows for the local modulation depth of the sine frequency:

$$m_{x,y} = \frac{\sqrt{a_{1x,y}^2 + b_{1x,y}^2}}{a_{0x,y}} \propto \sqrt{a_{1x,y}^2 + b_{1x,y}^2} \quad \text{Equation 5a}$$

An optical section image is precisely the modulation depth multiplied by the image intensity (=DC component)

$$I_{sectioned_{xy}} = m_{x,y}' = m_{x,y} \bar{I} = \sqrt{a_{1x,y}^2 + b_{1x,y}^2} \quad \text{Equation 5b}$$

In addition, the phase angle can be calculated $$\tan(\varphi) = \frac{a_{1x,y}}{b_{1x,y}} \quad \text{Equation 6}$$

The coefficients $a_{1x,y}$ and $b_{1x,y}$, which are dependent on the modulation frequency, and the locally dependent mean value can initially be written as follows by changing the phase of the discrete Fourier expansion:

$$a_{0x,y} = \bar{I} = \frac{1}{N}\sum_{n=0}^{N-1} I_{x,y}\left(n\frac{2\pi}{N}\right) \quad \text{Equation 7}$$

$$a_{1x,y} = \frac{2}{N}\sum_{n=0}^{N-1} \sin\left(n\frac{2\pi}{N}\right) I_{x,y}\left(n\frac{2\pi}{N}\right) \quad \text{Equation 8}$$

$$b_{1x,y} = \frac{2}{N}\sum_{n=0}^{N-1} \cos\left(n\frac{2\pi}{N}\right) I_{x,y}\left(n\frac{2\pi}{N}\right), \quad \text{Equation 9}$$

where N is the quantity of phase steps.

By inserting Equations 7–9 in Equation 5, the local modulation depth $m_{x,y}$ can be calculated.

For three or four phase steps, the formulas are simplified for the last optical sections sought:

$$I_{sectioned_{xy}} = m_{x,y}' \quad \text{Equation 10}$$

$$= \frac{\sqrt{2}}{3}\left\{\sqrt{\begin{array}{l}\left[I_{x,y}(0) - I_{x,y}\left(\frac{2\pi}{3}\right)\right]^2 + \\ \left[I_{x,y}(0) - I_{x,y}\left(\frac{4\pi}{3}\right)\right]^2 + \\ \left[I_{x,y}\left(\frac{2\pi}{3}\right) - I_{x,y}\left(\frac{4\pi}{3}\right)\right]^2\end{array}}\right\}$$

for three phase steps $(0, 2\pi/3, 4\pi/3)$, and $$I_{sectioned_{xy}} = m_{x,y}' = \frac{1}{2}\sqrt{\begin{array}{l}[I_{x,y}(0) - I_{x,y}(\pi)]^2 + \\ \left[I_{x,y}\left(\frac{\pi}{2}\right) - I_{x,y}\left(\frac{3\pi}{2}\right)\right]^2\end{array}} \quad \text{Equation 11}$$

for four phase steps $(0, \pi/2, \pi, 3\pi/2)$.

In order to calculate the DC component, the "mean value" must be calculated over the phase images (Equation 7). For three phase angles:

$$\bar{I}_{x,y} = a_{0x,y} = \frac{1}{3}\left(I_{x,y}(0) + I_{x,y}\left(\frac{2\pi}{3}\right) + I_{x,y}\left(\frac{4\pi}{3}\right)\right) \quad \text{Equation 12a}$$

and, in a corresponding manner, for four phase angles:

$$\bar{I}_{x,y} = a_{0x,y} = \frac{1}{4}\left(I_{x,y}(0) + I_{x,y}\left(\frac{\pi}{2}\right) + I_{x,y}(\pi) + I_{x,y}\left(\frac{3\pi}{2}\right)\right) \quad \text{Equation 12b}$$

The simplest case is the calculation of the mean value with two phase steps:

$$\bar{I}_{x,y} = a_{0x,y} = \frac{1}{2}(I_{x,y}(0) + I_{x,y}(\pi)) \quad \text{Equation 12c}$$

Because of the displacement set for the trigonometric functions, the modulation frequencies are eliminated in the calculation with the help of the last equations 12c. This simple algorithm is especially advantageous also when using a square grating (see below) because all higher harmonics of the square grating are suppressed. For $N=2^n$, where n is a natural number, this is always the case. In general, when more than two phase steps are used, this is not the case. For example, with three phase steps (Equation 12a) the third harmonic leads to stripe artifacts when the mean value is formed.

The DC component calculated generally by Equation 7 and Equation 12 corresponds to conventional recording in the microscope. The depth contrast is not increased in this case. The calculation of the brightfield information with Equation 7 (12) is particularly applicable in an advantageous manner, since this processing makes it possible to switch from optical section to conventional recording without having to mechanically remove the structure from the beam path.

When both the DC component and an optical section (AC component) are calculated, the out-of-focus information can also be determined (after suitable calibration) by subtraction (DC−AC).

When using a square grating, the following series expansion can be used for illustration:

$$I(x, y, \varphi) = a_{0x,y} + \sum_{i=0}^{\infty} \frac{m_{k_x(2i+1)_{x,y}} \sin\left(k_x(2i+1)\left(x + \frac{\varphi}{k_x}\right)\right)}{(2i+1)} \quad \text{Equation 13}$$

The modulation depth of the grating frequency when focusing, e.g., on a mirror as specimen, can be described by the modulation transfer function [T. Wilson].

$$m_k = \frac{2}{\pi}\left[a\cos\left(\frac{k\lambda}{2NA}\right) - \frac{k\lambda}{2NA}\sqrt{1 - \left(\frac{k\lambda}{2NA}\right)^2}\right] \quad \text{Equation 14}$$

with incoherent illumination and incident illumination, where

NA=numerical aperture
λ=wavelength
k=spatial frequency.

The formula above is applicable for circular pupils. In defocusing, a wave aberration, as complex phase factor, must be multiplied by the pupil function.

Referring to Equation 10, it will be seen that the three-phase formula implicitly suppresses the third harmonic of the Fourier expansion of a square grating (Equation 13, i=1). Not until the fifth harmonic (i=2) does an interference term and, therefore, a residual modulation (artifact) result. When the one-dimensional grating is so dimensioned that the fifth harmonic can not be transmitted through the optical lowpass, i.e., is selected so as to be greater than the optical limit frequency $$k_{limit} = \frac{2NA}{\lambda}, \quad \text{Equation 15}$$

the artifacts can be completely suppressed by higher harmonics. This is not the case when Equation 11 is applied, i.e., when using four phase steps for calculating the (local) modulation depth. Therefore, Equation 11 can be used in connection with square gratings only to a limited extent, e.g., in case even the third harmonic in the Fourier expansion is not transmitted through the optics. It is advantageous with respect to Equation 11, under this additional pre-condition, that the second harmonic of the grating can be implicitly suppressed by the algorithm.

Technical Implementation

Technical implementations are shown in FIGS. 3 and 4 and further details on the implementations are shown in FIGS. 5 to 8.

The following details of the implementations which are to be applied in the imaging systems for application in fluorescence microscopy (FIG. 3) and reflection microscopy (FIG. 4) will once again be presented in this connection. The relevant implementations are:

Phase adjustment by means of a plane-parallel plate (plane-plate micrometer)

The (motor-actuated) movement of the grating in axial direction for correcting longitudinal chromatic errors (focus correction)

Correction of instability in the light source through the measurement of the light intensity by means of a photodetector (typically a photodiode) and subsequent numerical correction by scaling the acquired individual phase images Correction, e.g., of bleaching of dyes in fluorescence microscopy by means of an optimized averaging process Implementation of a fast shutter by means of scanners corresponding to FIG. 5

Correction, e.g., of statistical changes in the spatial phase of the grating by solving a system of equations Implementation of a system for the use of a two-dimensional grating using two orthogonal plane-plate micrometers.

Phase Displacement by Means of a Plane-parallel Plate

The adjustment of the phase position of the grating can be advantageously realized by means of parallel displacement (plane-plate micrometer). The principle is shown in FIG. 6. A plane-parallel glass plate (e.g., made of BK7) is arranged after the grating and, e.g., well-defined angles are adjusted by means of a galvanometer scanner. The use of a scanner offers the advantage in particular of a precise and fast adjustment of the angle. Typical adjusting angles in the range of about +/−15° with an adjusting accuracy of <50 μrad and an adjusting time of less than 5 ms are technically possible.

The data can be recorded synchronous with the detector in two ways:

by a continuous movement of the plane-parallel plate and synchronization with the camera by a stepwise, sequential approach to the scan position Sequential positioning offers the advantage of a higher modulation depth (=contrast) of the structured object and independence of the contrast from the ratio of exposure time to readout time of the camera.

In order to optimize the excitation-side transmission on the one hand and to minimize multiple reflections at the plane-parallel plate on the other hand, it is advantageous to minimize the reflections at all optical components, particularly the structure (or the substrate) and the plane-parallel plate, by antireflection coatings. Further, it is advantageous to insert the plane-parallel plate into the optical beam path at a small angle (not equal to 0°). Interfering reflections can be eliminated in this way.

Focus Correction, Compensation of Longitudinal Chromatic Aberration

Although the imaging, for example, of fluorescing objects and reflecting objects, is identical in some respects, the differences between excitation wavelength and emission wavelength (Stokes shift), e.g., in fluorescing objects, present several essential points to be considered.

Since, as a rule, chromatically corrected objectives also have a longitudinal chromatic aberration, the grating, object and TV intermediate image plane are each located in the optically conjugate planes only for one excitation/emission wavelength. With a change in the spectral ratios (filter change) or when the objectives are exchanged, the focus position of the object, grating and camera that has already been adjusted is no longer given. This leads to a reduction in contrast in the structured image and, with larger longitudinal chromatic aberrations, to stripe artifacts in the calculated optical section image.

The focus adjustment of the object on the intermediate image plane of the camera can be realized by refocusing. However, it is also necessary to correct the grating position relative to the object plane. The advantageous use of a manual or motor-operated adjusting possibility for focus adjustment of the grating on the object is shown in the present patent application. This can be implemented in two different ways using ICS optics:

a) Displacement of the tube lens in FIG. 1.
b) Displacement of the grating position in FIG. 2.

Even when the wavelengths for excitation and detection are substantially identical (reflection microscopy), an axial movement of the structure or illumination-side tube lens may also be necessary for correction due to chromatic aberrations. In particular, this is the case when changing from the visible spectral range to UV, for example.

Figure 7B:
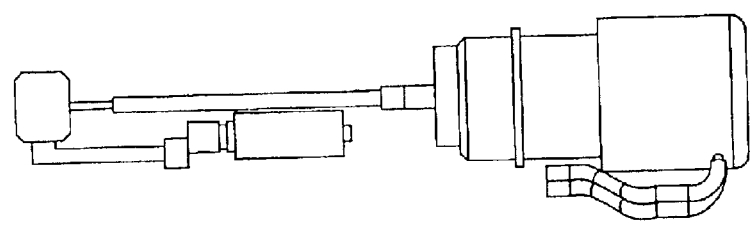

The grating position can be adapted, for example, by an eccentric movement (FIGS. 7a, 7b). Given sufficient space (or a sufficiently small necessary focus correction), it is possible to use an optical wedge and, therefore, to change the optical path length (FIGS. 9, 10).

Correction of Time-dependent Intensity Instability of the Light Source

A change over time in the intensity of the light source during the detection of the phase images, generally N>=3 phase images, leads to stripe artifacts in the calculated optical section image, since a light source that is constant over time is assumed in the derivation of the formulas given above. The following steps can be taken to eliminate this influence of time-dependent changes in illumination which interferes with image quality. In a first step, a measurement value for the illumination intensity (shown in FIGS. 3, 4, 5) is obtained for the intensity of the light source, e.g., by imaging on a light-sensitive receiver, e.g., a commercially available photodiode. The time interval for the integration must be matched to the time interval for the exposure of the CCD chip of the camera. The voltage signal of the photodiode circuit is subsequently digitized by means of an A-D converter. After measurement of the N individual images with the spatial phases $$\varphi_n = \frac{2\pi n}{N}, \qquad \text{Equation 16}$$

they can be scaled, e.g., as follows:

$$I_{norm_{x,y}}(\varphi_n) = \frac{I_{x,y}(\varphi_n)}{C(\varphi_n)} \qquad \text{Equation 17}$$

with the digitized photodiode signal $$\overline{PD_{Signal}} := \frac{\sum_{n=0}^{N-1} PD_{Signal}(\varphi_n)}{N}, \qquad \text{Equation 18}$$

averaged over the image phases, and the correction factor $$C(\varphi_n) := \frac{PD_{Signal}(\varphi_n)}{\overline{PD_{Signal}}} \qquad \text{Equation 19}$$

Phase Instability, Phase Adjustment Speed

In order to minimize phase instability, it is advantageous to use a temperature-stabilized galvanometer scanner (e.g., M2T, manufactured by General Scanning). A scanner of this type also enables a short phase adjustment time of a few milliseconds. In order to optimize phase stability, the scanner is controlled electronically by a closed control loop.

In addition, an SW correction of phase instabilities can be carried out by measuring the phases and subsequently approximating with a sine function according to the method described in the following.

While an exact displacement of the projected structure by an Nth of the period is assumed in Equations 7–9, the modulation depth can also be determined when the intensity is recorded in three or more virtually optional positions. First, the phase angle $\phi$ in Equation 1 must be measured for all positions of the structure. This can be carried out in different ways.

1. By measurement at the mechanical actuating element responsible for the displacement of the structure (e.g., the scanner)

2. By determining from the recorded image, e.g., by Fourier transformation or by approximation of the recorded intensity values with a sine function 3. Determining as in 2) above, but with a sensor which directly records the projected structure. This can also be achieved in that an optical element which images the structure directly on a partial area of the detector that is also used for recording the intensities of the specimen is arranged in the beam path.

When determining the displacement of the structure, it is sufficient to determine the displacement relative to the first position.

To determine the modulation depth, N intensity values which were recorded at N positions of the structure are considered and the index n is given in Equation 2 for the nth position:

$$I_{x,y}(\phi_n) = a_{0x,y} + a_{1x,y} \cdot \sin(\phi_n) + b_{1x,y} \cdot \cos(\phi_n) \qquad \text{Equation 20}$$

The measured intensities $M_{x,y}(\phi_n)$ can deviate from the expected intensities $I_{x,y}(\phi_n)$. The method of least error squares can be used for approximation:

$$\sum_{n=0}^{N-1} (M_{x,y}(\varphi_n) - I_{x,y}(\varphi_n))^2 \to \min \qquad \text{Equation 21}$$

Derivation by $a_{0x,y}$, $a_{1x,y}$ and $b_{1x,y}$ gives the following linear equation system:

$$\begin{pmatrix} N & \sum_{n=0}^{N-1} \sin(\varphi_n) & \sum_{n=0}^{N-1} \cos(\varphi_n) \\ \sum_{n=0}^{N-1} \sin(\varphi_n) & \sum_{n=0}^{N-1} \sin^2(\varphi_n) & \sum_{n=0}^{N-1} \sin(\varphi_n)\cos(\varphi_n) \\ \sum_{n=0}^{N-1} \cos(\varphi_n) & \sum_{n=0}^{N-1} \sin(\varphi_n)\cos(\varphi_n) & \sum_{n=0}^{N-1} \cos^2(\varphi_n) \end{pmatrix} \cdot \begin{pmatrix} a_{0x,y} \\ a_{1x,y} \\ b_{1x,y} \end{pmatrix} = \begin{pmatrix} \sum_{n=0}^{N-1} M_{x,y}(\varphi_n) \\ \sum_{n=0}^{N-1} \sin(\varphi_n) M_{x,y}(\varphi_n) \\ \sum_{n=0}^{N-1} \cos(\varphi_n) M_{x,y}(\varphi_n) \end{pmatrix}$$

Equation 22

The system of equations is solvable for N>2. The matrix is only dependent on the positions and needs to be inverted only once per image sequence to solve the system. The modulation depth is then obtained from $a_{1x,y}$ and $b_{1x,y}$ with Equation 5.

The method can also be used in a comparable manner when the projected structure is not sinusoidal by approximating with another function.

Minimizing the Bleaching of Dyes in Fluorescence Applications

In order to minimize the effect of bleaching of dyes, the specimen to be investigated is ideally illuminated only during the camera exposure time. The influence of a continuous exposure during the recording of, e.g., three individual phase images for generating an optical section increases as the selected exposure time decreases compared to the data transfer time (from the camera to the PC) and as the exposure intensity increases. Typical data transfer times for digital CCD cameras are currently in the range of about 10 ms to 100 ms with a resolution of about 512×512 pixel/image. With exposure times in this range, the specimen is already significantly damaged in some cases without making use of the fluorescence emission during the data transfer. For the most careful possible handling of the specimen, it is desirable to integrate a fast illumination-side shutter.

A simple solution consists in the use of electromagnetic "Uniblitz" shutters manufactured by Vincent Associates, 1255 University Avenue, Rochester, N.Y. 14607. An alternative solution consists in the arrangement shown in FIG. 5. The shutter shown in FIG. 5 comprises a plane mirror (22) whose angle relative to the optical axis can be adjusted, e.g., by means of a scanner, followed by a prism (21) and a stationary mirror (23). An "open" position or through-position (beam path with solid lines) and a "closed" or shutter position (beam path in dashed lines) can be realized by means of this combination. The possible switching times depend on the scanner that is used and on the size of the plane mirror. Typical switching times for mirror diameters of approximately 25 mm are about 1 ms.

Algorithm for minimizing artifacts by bleaching of dyes in fluorescence applications In order to compensate for bleaching of dyes, the following sequence can be used for recording the phase images with a linear approach:

$$I_{x,y}(0), I_{x,y}\left(\frac{2\pi}{3}\right), I_{x,y}\left(\frac{4\pi}{3}\right), I_{x,y}\left(\frac{4\pi}{3}\right), I_{x,y}\left(\frac{2\pi}{3}\right), I_{x,y}(0)$$

The order of the above sequence represents the time sequence of the acquisition of the phase images. From the respective three phase images $$I_{x,y}(0), I_{x,y}\left(\frac{2\pi}{3}\right), I_{x,y}\left(\frac{4\pi}{3}\right)$$

and $$I_{x,y}\left(\frac{4\pi}{3}\right), I_{x,y}\left(\frac{2\pi}{3}\right), I_{x,y}(0),$$

the optical sections, for example, are to be calculated using Equation 10 and the mean value is formed.

$$\overline{I_{sectioned_{xy}}} = \frac{I_{sectioned_{xy}}\left(0, \frac{2\pi}{3}, \frac{4\pi}{3}\right) + I_{sectioned_{xy}}\left(\frac{4\pi}{3}, \frac{2\pi}{3}, 0\right)}{2} \quad \text{Equation 24}$$

The formation of artifacts in the calculated optical section image is accordingly minimized in a linear approximation of the bleaching process.

Grating Detection, Module Detection

For purposes of simple mechanical switching from conventional microscope recording to structured illumination, and vice versa, it is advantageous to combine a free position with a field diaphragm with the grating. This is shown in FIG. 8.

Since the depth discrimination in structured illumination depends, among other things, on the effective grating frequency, which is determined in turn by the illumination-side total magnification (tube lens+condenser or objective), it is advantageous to provide a simple possibility for exchanging the grating used for projection.

To prevent errors in case of incorrectly inserted gratings, it is advantageous, for example, to code the mechanically mounted gratings. The coding shown in FIG. 12 can be used for this purpose.

While the foregoing description and drawings represent the present invention, it will be obvious to those skilled in the art that various changes may be made therein without departing from the true spirit and scope of the present invention.

What is claimed is:

1. A method for increasing the depth discrimination of optically imaging systems comprising the steps of:
   projecting a periodic structure in the object;
   detecting N, N>=3 structured images of the object with phase angles $$\varphi_n = n\frac{2\pi}{N},$$

n=0 . . . N−1 of the projected structure; and
   generating optical sections by evaluation of the images with the N different phase angles by the equation:

$$I_{sectioned_{xy}} = m_{x,y}' = m_{x,y}\bar{I} = \sqrt{a_{1x,y}{}^2 + b_{1x,y}{}^2}.$$

2. A method for increasing the depth discrimination of optically imaging systems comprising the steps of:
   projecting a periodic structure in the object;
   detecting three structured images of the object with the three phase angles 0°, 120°, 240° of the projected structure; and
   generating optical sections by evaluation of the three images with different phases by the equation:

$$I_{sectioned_{xy}} = m_{x,y}' = \frac{\sqrt{2}}{3}\left\{\sqrt{\left[I_{x,y}(0)-I_{x,y}\left(\frac{2\pi}{3}\right)\right]^2 + \left[I_{x,y}(0)-I_{x,y}\left(\frac{4\pi}{3}\right)\right]^2 + \left[I_{x,y}\left(\frac{2\pi}{3}\right)-I_{x,y}\left(\frac{4\pi}{3}\right)\right]^2}\right\}.$$

3. A method for increasing the depth discrimination of optically imaging systems comprising the steps of:
   projecting a periodic structure in the object;
   detecting four structured images of the object with the four phase angles 0°, 90°, 180°, 270° of the projected structure; and
   generating optical sections by evaluation of the four images with different phases by the equation:

$$I_{sectioned_{xy}} = m_{x,y}' = \frac{1}{2}\sqrt{[I_{x,y}(0)-I_{x,y}(\pi)]^2 + \left[I_{x,y}\left(\frac{\pi}{2}\right)-I_{x,y}\left(\frac{3\pi}{2}\right)\right]^2}.$$

4. A method for increasing the depth discrimination of optically imaging systems comprising the steps of:
   projecting a periodic structure in the object;

detecting N, N>=3 structured images of the object with phase angles $$\varphi_n = n\frac{2\pi}{N},$$

n=0 . . . N−1 of the projected structure; and calculating structure-free images by the equation:

$$a_{0x,y} = \bar{I} = \frac{1}{N}\sum_{n=0}^{N-1} I_{x,y}\left(n\frac{2\pi}{N}\right)$$

wherein the image of the object calculated in this way does not have increased depth discrimination.

5. A method for increasing the depth discrimination of optically imaging systems comprising the steps of:

projecting a periodic structure in the object;

detecting two structured images of the object with phase angles of 0° and 180°; and calculating a synthetic image by the equation:

$$\bar{I}_{x,y} = a_{0x,y} = \frac{1}{2}(I_{x,y}(0) + I_{x,y}(\pi))$$

wherein the image of the object calculated in this way does not have increased depth discrimination.

6. A method for increasing the depth discrimination of optically imaging systems comprising the steps of:

projecting a periodic structure in the object;

detecting four structured images of the object with phase angles of 0°, 90°, 180°, 270°; and calculating a synthetic image by the equation:

$$a_{0x,y} = \bar{I} = \frac{1}{N}\sum_{n=0}^{N-1} I_{x,y}\left(n\frac{2\pi}{N}\right)$$

wherein the image of the object calculated in this way does not have increased depth discrimination.

7. A method for increasing the depth discrimination of optically imaging systems comprising the steps of:

projecting a periodic structure in the object;

detecting three structured images of the object with phase angles of 0°, 120° and 240°; and calculating a synthetic image by the equation:

$$\bar{I}_{x,y} = a_{0x,y} = \frac{1}{3}\left(I_{x,y}(0) + I_{x,y}\left(\frac{2\pi}{3}\right) + I_{x,y}\left(\frac{4\pi}{3}\right)\right)$$

wherein the image of the object calculated in this way does not have increased depth discrimination.

8. A method for increasing the depth discrimination of optically imaging systems comprising the steps of:

projecting a periodic structure in the object;

detecting four structured images of the object with phase angles of 0°, 90°, 180°, 270°; and calculating a synthetic image by the equation:

$$\bar{I}_{x,y} = a_{0x,y} = \frac{1}{4}\left(I_{x,y}(0) + I_{x,y}\left(\frac{\pi}{2}\right) + I_{x,y}(\pi) + I_{x,y}\left(\frac{3\pi}{2}\right)\right)$$

wherein the image of the object calculated in this way does not have increased depth discrimination.

9. The method of claim 1 including using said method in all linear interactions.

10. The method of claim 1 including using said method in microscopy.

11. The method of claim 1 including using said method in incident light microscopy.

12. The method of claim 1 including use in incident brightfield microscopy.

13. The method of claim 1 including use in transmitted light microscopy.

14. The method of claim 1 including use in incident fluorescence microscopy.

15. An arrangement for increasing the depth discrimination of optically imaging systems comprising:

means for projecting a periodic structure in the object;

means for detecting N, N>=3 structured images of the object with phase angles $$\varphi_n = n\frac{2\pi}{N},$$

n=0 . . . N−1 of the projected structure; and means for generating optical sections by evaluation of the images with the N different phase angles by the equation:

$$I_{sectioned_{xy}} = m'_{x,y} = m_{x,y}\bar{I} = \sqrt{a_{1x,y}^2 + b_{1x,y}^2}.$$

16. An arrangement for increasing the depth discrimination of optically imaging systems comprising:

means for projecting a periodic structure in the object;

means for detecting three structured images of the object with the three phase angles 0°, 120°, 240° of the projected structure; and means for generating optical sections by evaluation of the three images with different phases by the equation:

$$I_{sectioned_{xy}} = m'_{x,y} = \frac{\sqrt{2}}{3}\left\{\sqrt{\left[I_{x,y}(0) - I_{x,y}\left(\frac{2\pi}{3}\right)\right]^2 + \left[I_{x,y}(0) - I_{x,y}\left(\frac{4\pi}{3}\right)\right]^2 + \left[I_{x,y}\left(\frac{2\pi}{3}\right) - I_{x,y}\left(\frac{4\pi}{3}\right)\right]^2}\right\}.$$

17. An arrangement for increasing the depth discrimination of optically imaging systems comprising:

means for projecting a periodic structure in the object;

means for detecting four structured images of the object with the four phase angles 0°, 90°, 180°, 270° of the projected structure; and means for generating optical sections by evaluation of the four images with different phases by the equation:

$$I_{sectioned_{xy}} = m'_{x,y} = \frac{1}{2}\sqrt{[I_{x,y}(0) - I_{x,y}(\pi)]^2 + \left[I_{x,y}\left(\frac{\pi}{2}\right) - I_{x,y}\left(\frac{3\pi}{2}\right)\right]^2}.$$

18. An arrangement for increasing the depth discrimination of optically imaging systems comprising:

means for projecting a periodic structure in the object;

means for detecting N, N>=3 structured images of the object with phase angles $$\varphi_n = n\frac{2\pi}{N},$$

n=0 . . . N−1 of the projected structure; and means for calculating structure-free images by the equation:

$$a_{0x,y} = \bar{I} = \frac{1}{N}\sum_{n=0}^{N-1} I_{x,y}\left(n\frac{2\pi}{N}\right)$$

wherein the image of the object calculated in this way does not have increased depth discrimination.

19. An arrangement for increasing the depth discrimination of optically imaging systems comprising:

means for projecting a periodic structure in the object;

means for detecting two structured images of the object with phase angles of 0° and 180°; and means for calculating a synthetic image by the equation:

$$\bar{I}_{x,y} = a_{0x,y} = \frac{1}{2}(I_{x,y}(0) + I_{x,y}(\pi))$$

wherein the image of the object calculated in this way does not have increased depth discrimination.

20. An arrangement for increasing the depth discrimination of optically imaging systems comprising:

means for projecting a periodic structure in the object;

means for detecting four structured images of the object with phase angles of 0°, 90°, 180°, 270°; and means for calculating a synthetic image by the equation:

$$a_{0x,y} = \bar{I} = \frac{1}{N}\sum_{n=0}^{N-1} I_{x,y}\left(n\frac{2\pi}{N}\right)$$

wherein the image of the object calculated in this way does not have increased depth discrimination.

21. An arrangement for increasing the depth discrimination of optically imaging systems comprising:

means for projecting a periodic structure in the object;

means for detecting three structured images of the object with phase angles of 0°, 120° and 240°; and means for calculating a synthetic image by the equation:

$$\bar{I}_{x,y} = a_{0x,y} = \frac{1}{3}\left(I_{x,y}(0) + I_{x,y}\left(\frac{2\pi}{3}\right) + I_{x,y}\left(\frac{4\pi}{3}\right)\right)$$

wherein the image of the object calculated in this way does not have increased depth discrimination.

22. An arrangement for increasing the depth discrimination of optically imaging systems comprising:

means for projecting a periodic structure in the object;

means for detecting four structured images of the object with phase angles of 0°, 90°, 180°, 270°; and means for calculating a synthetic image by the equation:

$$\bar{I}_{x,y} = a_{0x,y} = \frac{1}{4}\left(I_{x,y}(0) + I_{x,y}\left(\frac{\pi}{2}\right) + I_{x,y}(\pi) + I_{x,y}\left(\frac{3\pi}{2}\right)\right)$$

wherein the image of the object calculated in this way does not have increased depth discrimination.

23. The arrangement for increasing the depth discrimination of optically imaging systems according to claim 15, wherein the spatial phase of the projected structure is adjusted by a plane-parallel plate which is rotatable about an axis perpendicular to the optical axis.

24. The arrangement according to claim 15, wherein the spatial phase is adjusted by a galvanometer scanner.

25. The arrangement according to claim 15, wherein the structure can be move in axial direction in addition.

26. The arrangement according to claim 15, wherein the illumination-side tube lens can be moved in axial direction in addition.

27. The arrangement according to claim 25 with motor-actuated movement.

28. The arrangement according to claim 26 with motor-actuated movement.

29. The arrangement according to claim 27 wherein said motor-actuated movement uses a motor controlled eccentric.

30. The arrangement according to claim 27 wherein said motor-actuated movement utilizes an optical wedge.

31. The arrangement according to claim 15 in combination with the measurement of the light intensity by a light-sensitive detector.

32. The arrangement according to claim 31 in combination with the measurement of the light intensity by a light-sensitive detector, wherein a photodiode is used as light-sensitive detector.

33. The arrangement according to claim 31, wherein the digitized signal of the light-sensitive detector is used for scaling the image brightness.

34. The arrangement according to claim 33, wherein the digitized signal of the light-sensitive detector is used for scaling the image brightness using Equation 17.

35. The arrangement according to claim 15, wherein the calculation of depth-discriminated images is obtained by solving the system of equations given by the equations:

$$I_{x,y}(\phi_n) = a_{0x,y} + a_{1x,y}\cdot\sin(\phi_n) + b_{1x,y}\cdot\cos(\phi_n)$$

$$\sum_{n=0}^{N-1}(M_{x,y}(\varphi_n) - I_{x,y}(\varphi_n))^2 \to \min$$

and $$\begin{pmatrix} N & \sum_{n=0}^{N-1}\sin(\varphi_n) & \sum_{n=0}^{N-1}\cos(\varphi_n) \\ \sum_{n=0}^{N-1}\sin(\varphi_n) & \sum_{n=0}^{N-1}\sin^2(\varphi_n) & \sum_{n=0}^{N-1}\sin(\varphi_n)\cos(\varphi_n) \\ \sum_{n=0}^{N-1}\cos(\varphi_n) & \sum_{n=0}^{N-1}\sin(\varphi_n)\cos(\varphi_n) & \sum_{n=0}^{N-1}\cos^2(\varphi_n) \end{pmatrix} \cdot \begin{pmatrix} a_{0x,y} \\ a_{1x,y} \\ b_{1x,y} \end{pmatrix} =$$

$$\begin{pmatrix} \sum_{n=0}^{N-1} M_{x,y}(\varphi_n) \\ \sum_{n=0}^{N-1} \sin(\varphi_n) M_{x,y}(\varphi_n) \\ \sum_{n=0}^{N-1} \cos(\varphi_n) M_{x,y}(\varphi_n) \end{pmatrix}.$$

36. The arrangement according to claim 15 also including use of an automatic shutter.

37. The arrangement according to claim 15 also including use of a shutter.

38. The arrangement according to claim 15 also including minimizing artifacts through the use of averaging according to the equation:

$$\overline{I_{sectioned_{xy}}} = \frac{I_{sectioned_{xy}}\left(0, \frac{2\pi}{3}, \frac{4\pi}{3}\right) + I_{sectioned_{xy}}\left(\frac{4\pi}{3}, \frac{2\pi}{3}, 0\right)}{2}.$$

39. The arrangement according to claim 15 also including implementation of a module with two diaphragm apertures.

40. The arrangement according to claim 15 also including the coding of the grating with a bar code for automatic detection of the grating.

41. The arrangement according to claim 15 also including the coding of the grating with a stripe code for automatic detection of the grating.

42. The arrangement according to claim 15 also including exchangeable gratings.

43. The arrangement according to claim 42 wherein the illumination-side tube lens is moved in axial direction in addition.

44. The arrangement according to claim 43 with motor-actuated movement.

45. The arrangement according to claim 44 wherein the motor actuated movement uses a motor controller eccentric.

46. The arrangement according to claim 44 wherein the motor actuated movement uses an optical wedge.

47. The arrangement according to claim 43 in combination with the measurement of the light intensity by a light-sensitive detector.

48. The arrangement according to claim 47 in combination with the measurement of the light intensity by a light-sensitive detector, wherein a photodiode is used as light-sensitive detector.

49. The arrangement according to claim 47, wherein the digitized signal of the light-sensitive detector is used for scaling the image brightness.

50. The arrangement according to claim 49, wherein the digitized signal of the light-sensitive detector is used for scaling the image brightness using Equation 17.

51. The arrangement according to claim 50, wherein the calculation of depth-discriminated images is obtained by solving the system of equations given by the equations:

$$I_{x,y}(\phi_n) = a_{0x,y} + a_{1x,y} \cdot \sin(\phi_n) + b_{1x,y} \cdot \cos(\phi_n)$$

$$\sum_{n=0}^{N-1} (M_{x,y}(\varphi_n) - I_{x,y}(\varphi_n))^2 \to \min$$

and $$\begin{pmatrix} N & \sum_{n=0}^{N-1} \sin(\varphi_n) & \sum_{n=0}^{N-1} \cos(\varphi_n) \\ \sum_{n=0}^{N-1} \sin(\varphi_n) & \sum_{n=0}^{N-1} \sin^2(\varphi_n) & \sum_{n=0}^{N-1} \sin(\varphi_n)\cos(\varphi_n) \\ \sum_{n=0}^{N-1} \cos(\varphi_n) & \sum_{n=0}^{N-1} \sin(\varphi_n)\cos(\varphi_n) & \sum_{n=0}^{N-1} \cos^2(\varphi_n) \end{pmatrix} \cdot \begin{pmatrix} a_{0x,y} \\ a_{1x,y} \\ b_{1x,y} \end{pmatrix} =$$

$$\begin{pmatrix} \sum_{n=0}^{N-1} M_{x,y}(\varphi_n) \\ \sum_{n=0}^{N-1} \sin(\varphi_n) M_{x,y}(\varphi_n) \\ \sum_{n=0}^{N-1} \cos(\varphi_n) M_{x,y}(\varphi_n) \end{pmatrix}.$$

* * * * *